United States Patent Office 3,196,711
Patented July 27, 1965

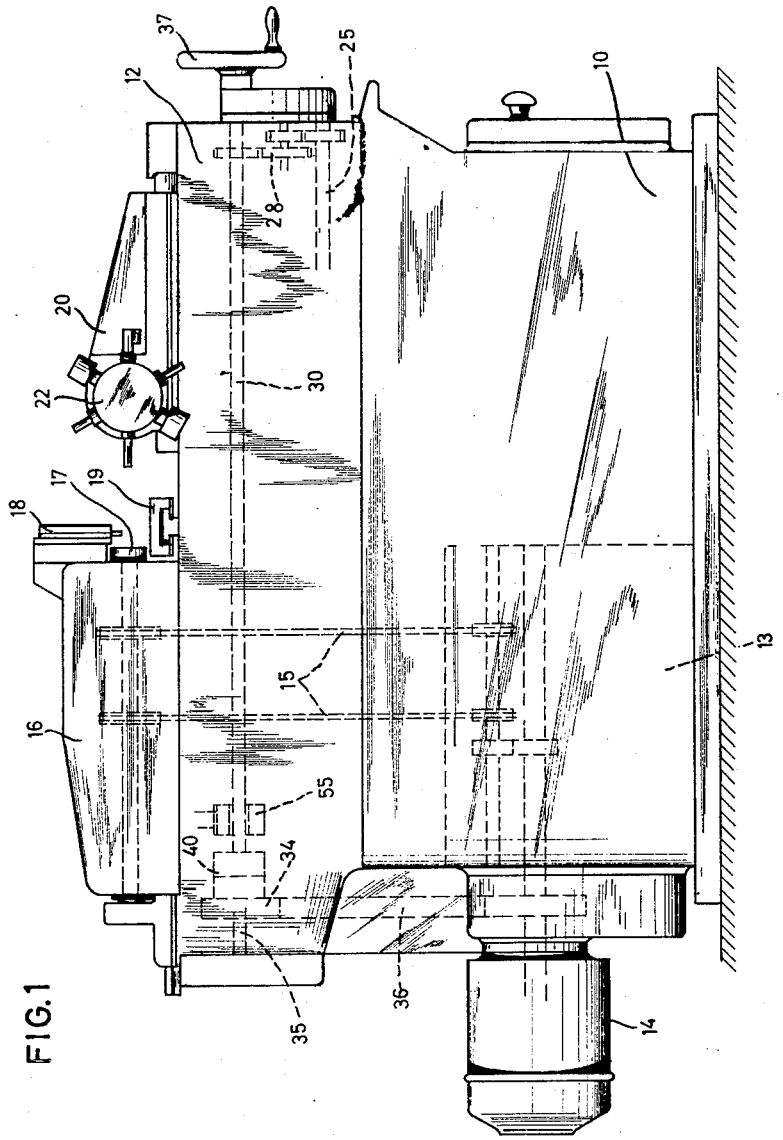

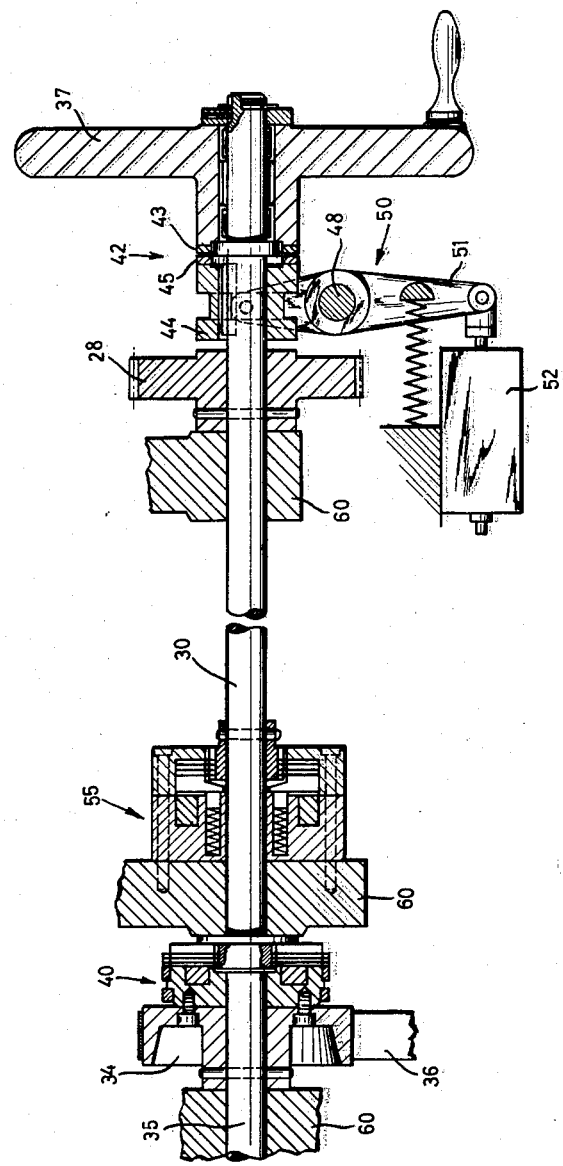

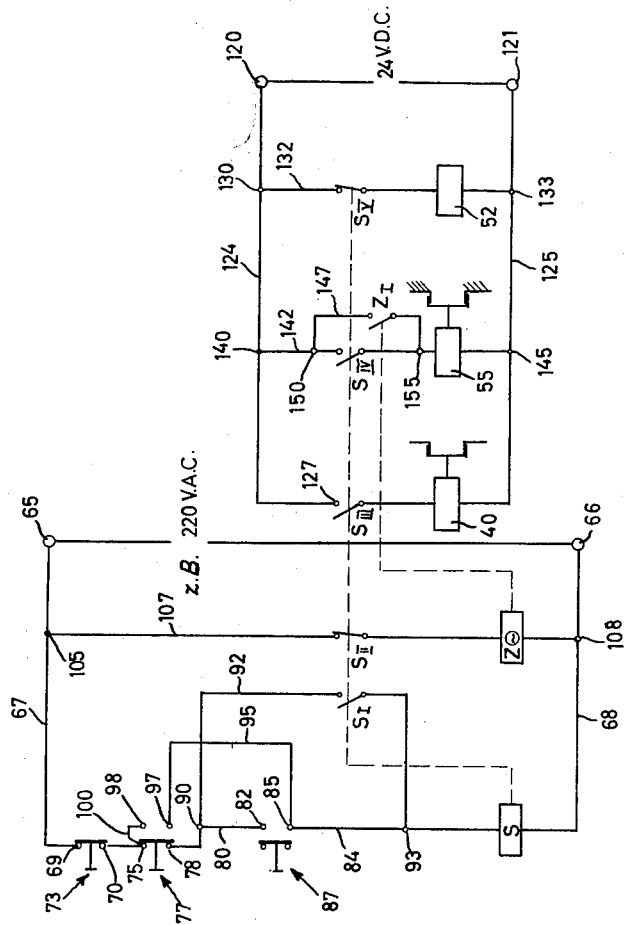

3,196,711
MACHINE TOOL TRANSMISSION
ARRANGEMENT
Karl Spohn, Oberesslingen (Neckar), Germany, assignor to Index-Werke K.G. Hahn & Tessky, Esslingen (Neckar), Germany
Filed Dec. 13, 1961, Ser. No. 159,496
Claims priority, application Germany, Dec. 17, 1960, J 19,168
11 Claims. (Cl. 74—625)

The present invention relates to machine tools.

More particularly, the present invention relates to machine tools such as screw machines, turret lathes, and the like.

With machine tools of this type, once they are set up they continue to operate. However, certain problems are involved in the setting up of the machine tools. During the setting up operations the operator is required to operate the machine tool by hand, and also it may be desired to momentarily operate the machine tool from its drive during the setting up operations. In order to accomplish these results conventional machines require the operator on the one hand to connect and disconnect the drive to and from the machine tool and on the other hand to connect and disconnect the manually operable driving structure to and from the machine tool. For example, where the machine tool is driven from an electric motor and is also capable of being manually operated by a handwheel or the like, for setting up purposes, it is necessary for the operator on the one hand to connect and disconnect the electric motor to and from the machine tool and on the other hand to connect and disconnect the handwheel to and from the machine tool. Thus, the operator will at the end of a particular job disconnect the electric motor from the machine tool and will then connect the handwheel to the machine tool. Before again connecting the electric motor to the machine tool, however, the operator must be very careful to make certain that he disconnects the handwheel since otherwise this handwheel will be driven and can cause serious injury. Moreover, if at a certain stage of the setting up period the operator wishes to drive the machine tool from the electric motor for relatively short periods of time in order to check the setting up operations, then of course the operator is very busy connecting and disconnecting both the drive from the electric motor and the handwheel to and from the machine so that a great deal of time and inconvenience results and the operator cannot devote his entire attention to the setting up operations so that it does not infrequently happen that errors occur in these setting up operations because of the fact that the operator has to devote so much of his attention and time to the purely manipulative connecting and disconnecting of the electrical drive and the manual drive to and from the machine tool, exercising great care that neither of these drives is connected while the other is also connected.

It is accordingly a primary object of the present invention to provide for a machine tool of the above type a structure which will reliably guarantee that the power and manual drives cannot be simultaneously connected to the machine tool.

It is another object of the present invention to provide a structure which will disconnect one drive when the other drive is connected to the machine tool. Thus, the structure of the invention will disconnect the power drive from the machine tool when the manual drive is connected thereto and will disconnect the manual drive from the machine tool when the power drive is connected thereto, so that the safety of the operator as well as the equipment is very greatly increased and at the same time there is a considerable saving of time and increase of convenience because the operator need only connect either the power drive or the manual drive to the machine tool and the other drive is disconnected.

It is a further object of the present invention to provide a structure of this type which will enable the operator during the setting up operations to very conveniently connect the power drive to the machine tool for relatively short periods of time determined manually by the operator so that the machine tool can be driven from the power drive as desired during the setting up operations.

A further object of the present invention is to provide for a structure of the above type a brake means which will quickly stop the operation of the machine tool when the power drive is disconnected therefrom.

Yet another object of the present invention is to provide for a machine tool a brake means of this type which will also bring the operation of the machine to a quick stop when there is a failure in the supply of power.

An additional object of the present invention is to provide a structure of the above type which is electrically controlled so that a minimum amount of structure is required while at the same time the structure will operate very reliably and very quickly to produce the desired results.

It is furthermore an object of the present invention to provide a structure capable of accomplishing all of the above objects and at the same time composed of simple rugged elements which are very reliable in operation and which require a minimum amount of maintenance.

With these objects in view the invention includes, in a machine tool, a transmission means for transmitting motion to various moving parts of a machine tool, a drive means for driving the transmission means, and a manually operable means for manually operating the transmission means. A drive clutch means interconnects the drive means with the transmission means when the drive clutch means is engaged and disconnects the drive means from the transmission means when the drive clutch means is disengaged. A manual clutch means connects the manually operable means to the transmission means when the manual clutch is engaged and disconnects the manually operable means from the transmission means when the manual clutch means is disengaged. In accordance with the present invention, a means interconnects the drive clutch means and the manual clutch means for disengaging the manual clutch means when the drive clutch means is engaged and for disengaging the drive clutch means in response to engagement of the manual clutch means.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a diagrammatic front elevation of a machine tool which includes the structure of the invention;

FIG. 2 is a fragmentary partly sectional and partly diagrammatic illustration of the structure of the invention; and FIG. 3 is a wiring diagram of the electrical circuitry, used with the structure of FIG. 2 in accordance with the present invention.

Referring to FIG. 1, there is shown therein, diagrammatically, a turret lathe which includes a lower frame 10 and an upper frame 12. Within the lower frame 10 is housed the drive transmission 13 which is operatively connected with an electrical driving motor 14 which runs continuously as long as the main switch for the entire machine is turned on. The transmission 13 serves to drive through suitable sprocket wheels a pair of endless chain drive elements 15 which drive sprocket wheels carried by the rotary work spindle 17 which is carried by the head stock 16. The upper frame also carries a pair of carriages 18 and 19 guided for movement transversely of the axis of the work spindle 17, and a carriage 20 is shiftable toward and away from the spindle 17 and carries the rotary turret 22 on which the various tools are mounted as is well known in the art. The several movable carriages 18–20 as well as the turret 22 are operated to move according to a preselected program of operation through cams and cam-follower levers which are actuated from the rotary control shaft 25 which is fragmentarily indicated in dotted lines in FIG. 1. This shaft 25 and the manner in which it controls the several moving components of the machine tool is well known in the art and forms no part of the present invention.

The control shaft 25 is driven through a set of change gears 28 from a rotary transmission shaft 30 which forms a transmission means for the machine tool of the invention. The rotary transmission shaft 30 is driven by a pulley 34 through a clutch means 40 described below. The pulley 34 is carried by a rotary shaft 35 which is coaxial with the shaft 30 and the pulley 34 is driven by a belt 36 which is driven from the motor 14. The clutch 40 forms a drive clutch means serving to connect the drive means 14, 34–36 to the rotary shaft 30 when the drive clutch means 40 is engaged and serving to disconnect the drive means from the rotary transmission shaft 30 when the drive clutch means 40 is disengaged. A manually operable means is provided for manually turning the transmission shaft 30 so as to manually move the various components of the machine tool, during setting up operations, and when the shaft 30 is manually rotated the clutch means 40 is disengaged so that the drive means 14, 34–36 is disconnected from the shaft 30 at this time. The manually operable means takes the form of a rotary handwheel 37 which through a manual clutch means 42 described below and shown in FIG. 2 is adapted to be connected operatively with the shaft 30 when the manual clutch means 42 is engaged. The rotary manually operable handwheel 37 is disconnected from the shaft 30 when the manually operable clutch means 42 is disengaged.

Referring to FIG. 2, it will be seen that the rotary handwheel 37 is freely turnable on and with respect to the rotary transmission shaft 30 but is prevented from shifting axially with respect to the shaft 30. The manual clutch means 42 is in the form of a dog clutch and includes one clutch member 43 fixed integrally with the handwheel 37 and a second clutch member 44 which is axially shiftable along the shaft 30 but which is keyed thereto so as to be constrained to rotate therewith. The shiftable clutch member 45 forms part of the axially shiftable sleeve 44 which is formed with an annular groove in which extends a pin roller carried by the free end portion of a lever 50 which is supported intermediate its ends by a stationary pivot 48 and which has an arm 51 linked with the armature of the electromagnet 52. As is indicated in FIG. 2 a compression spring urges the lever to turn in a counterclockwise direction about the pivot 48 so that this spring maintains the manual clutch means 42 in its illustrated disengaged position when the electromagnet 52 is not energized, while when this electromagnet 52 is energized the lever 50 is turned and crosswise direction in opposition to the compression spring so as to engage the manual clutch means 42 and thus connect the manually operable means 37 to the rotary transmission shaft 30.

Thus, it will be seen that the manual clutch means 42 is a mechanical clutch which through the linkage 50 is operatively connected with an electrical operating means 52 which controls the engagement and disengagement of the manual clutch means 42.

As is diagrammatically shown in FIG. 2 the drive clutch means 40 is also electrical. This drive clutch means 40 is a well known form of clutch which includes a series of clutch plates which are also interconnected with the shaft 35 and the shaft 30 by being shiftable in suitable key ways of the shaft 30 and of the clutch 40 at the part thereof which in the example illustrated in FIG. 2 is fixed to the pulley 34 for rotation therewith, this pulley 34 in turn being fixed to the shaft 35. The clutch 40 is shown in FIG. 2 as a magnetic clutch which includes an electromagnet which when energized draws the several laminations of the clutch tightly into engagement with each other so that those laminations which are constrained to rotate with the pulley 34 transmit the drive to those laminations which are constrained to rotate with the shaft 30, while when the electromagnet of the magnetic clutch 40 is unenergized the alternate laminations which are connected to the pulley 34 engage those laminations which are connected to the shaft 30 only loosely and thus no drive will be transmitted at this time. Electromagnetic clutches of this type are well known in the art. As is shown in FIG. 2, the shaft 30 is supported for rotary movement by a plurality of bearings 60, and a coaxial bearing 60 also supports the shaft 35 for rotary movement. Although it is possible to use in place of the magnetic clutch 40 a mechanical clutch operated through a suitable linkage and an electrical operating means as in the case of the handwheel 37, it is preferred to use the magnetic clutch assembly 40 shown in FIG. 2 because it is simpler and easier to install and because it is also easier to maintain.

As is shown in FIG. 2, the structure of the invention also includes a brake means 55 which has essentially the same structure as the magnetic clutch means 40. This barke means however, has the alternate laminations maintained stationary by connection with the stationary intermediate bearing 60 shown in FIG. 2, while those laminations which are constrained to rotate with the shaft 30 alternate with these stationary laminations of the brake means. When the electromagnet of the brake means 55 is energized the brake means is disengaged. A spring means is provided, as diagrammatically shown in FIG. 2, for pressing all the laminations tightly into engagement with each other so as to actuate the brake means for stopping the rotation of the shaft 30. When the electromagnet of the brake means 55 of FIG. 2 is energized, the electromagnet draws a plate which presses the laminations toward each other in opposition to the spring means to a position where the laminations no longer press tightly against each other, so that as long as the electromagnetic brake means 55 is energized no braking action is provided and the shaft 30 can rotate freely, while when the electromagnetic brake means is unenergized the spring means thereof instantly places the brake laminations into engagement with each other for very quickly stopping the rotation of the shaft 30.

During normal operation of the machine the electromagnet or solenoid 52 is energized so that the manual clutch means 42 is disengaged and during this time the drive clutch means 40 is energized and engaged so that the shaft 30 is driven by the power drive. In order to stop the normal operation of the machine so as to enable it to be operated by hand, for example, through a suitable push-button control, described below, the magnetic clutch 40 is disengaged, and simultaneously the electromagnet of the brake means 55 is also unenergized so that the brake means immediately stops the rotation of the shaft 30 when the drive clutch means 40 is disengaged. At the same time, the electrical operating means 52 is energized so as to turn lever 50 in a clockwise direction, as viewed in FIG. 2, and thus simultaneously with the disengagement of the drive clutch means 40 the manual clutch means 42 becomes engaged. The electromagnet of the brake means 55 is controlled through a time relay described below so that after a relatively short period of time the electromagnet of the brake means 55 again becomes energized and the brake means is disengaged so as to release the shaft 30 for rotation from the manually operable means 37.

If it is desired during the setting up operations to operate the machine from the power drive for relatively short periods of time, this type of operation can be provided also through the push-button arrangement described below so that the operator can manually maintain the drive clutch means 40 engaged for a length of time determined by the operator himself during the setting up operations, and with the structure of the invention during the time when the drive clutch means 40 is engaged for setting up purposes the manual clutch means 42 is disengaged by de-energizing of the electrical operating means 52. Thus, when during the setting up operations the operator manually maintains the clutch 40 engaged for a length of time determined solely by the operator himself the manual clutch means 42 is simultaneously disengaged and the handwheel 37 does not rotate.

The electrical circuitry for the structure of the invention is illustrated in FIG. 3. As was pointed out above, the electric motor 14 operates continuously as long as the main switch for the entire machine is closed, and therefore the circuit for the electrical motor 14 is not shown. The circuit illustrated in FIG. 3 includes a pair of junctions 65 and 66 between which is connected a source of alternating current of 220 v., for example. A pair of conductors 67 and 68 are respectively connected to the junctions 65 and 66 for the source of alternating current. The conductor 67 terminates in a contact 69 of a switch 73, this switch including a second contact 70. The switch 73 is in the form of a manually operable push button and this switch is spring-urged to the closed position shown in FIG. 3. The operator by depressing the push button will open the switch 73 and as soon as the operator releases the push button the switch will be closed. The contact 70 is connected through a suitable conductor to a second contact 75 of a switch 77 which also includes the contact 78, and this switch also includes a manually operable push button which is spring-urged to the illustrated position where the contacts 75 and 78 are electrically connected to each other. Through a conductor 100 the contact 75 is connected to a contact 98 which is spaced from a contact 97, and when the operator depresses the push button of the switch 77 he will place the contacts 97 and 98 into electrical connection with each other, the electrical connection between the contacts 75 and 78 being broken at this time. A conductor 80 connects the contact 78 with a contact 82 which forms part of a switch 87. A second contact 85 of the switch 87 is connected through the conductor 84 with the conductor 68. The switch 87 also includes a push button which is spring-urged to the illustrated position where the contacts 82 and 85 are not electrically connected to each other. When the operator depresses the push button of the switch 87 he will electrically interconnect the contacts 82 and 85 so as to close the switch. A conductor 95 extends from the contact 97 to the contact 85, as shown in FIG. 3, and an additional conductor 92 extends from the point 90 of the conductor 80 to the point 93, and this conductor 92 includes the holding relay switch $S_I$. This switch $S_I$ is normally open and is controlled by a relay coil S which in addition actuates a series of additional relay switches in a manner described below.

At the points 105 and 108 a conductor 107 is connected between the conductors 67 and 68, and this conductor 107 includes the normally closed switch $S_{II}$ of the relay S. In addition, there is located in the conductor 107 the time-delay relay Z. As is indicated in dotted lines in FIG. 3, the relay S not only cooperates with the switches $S_I$ and $S_{II}$, in addition this relay operates the pair of normally open switches $S_{III}$ and $S_{IV}$, and the normally closed switch $S_V$. Also, as is shown in dotted lines, the relay Z operates the normally open switch $Z_I$.

These switches $S_{III}$, $S_{IV}$, $S_V$ and $Z_I$ are located in a separate direct current circuit which includes the junctions 120 and 121 between which is located a source of direct current of 24 v., for example. A pair of conductors 124 and 125 are connected to the junctions 120 and 121, respectively. This direct current circuit is provided for the electrical operating means 52 and for the magnetic clutch means 40 and a magnetic brake 55. The conductor 124 terminates in the contact 127 of the switch $S_{III}$, and beyond this switch is located the magnetic clutch 40 which will of course be energized when the switch $S_{III}$ closes. A conductor 132 is connected at the points 130 and 133 to the pair of conductors 124 and 125, respectively, and this conductor 132 has the switch $S_V$ and the electromagnetic control 52 for the manual clutch means 42. In addition there is a conductor 142 connected at the points 140 and 145 to the pair of conductors 124 and 125, and this conductor 142 includes the switch $S_{IV}$ and the magnetic brake means 55. A conductor 147 extends around the switch $S_{IV}$ and is connected to the conductor 142 before and after the switch $S_{IV}$ at the points 150 and 155. In this conductor 147 is located at switch $Z_I$.

When the main switch of the machine is turned on so as to start the motor 14 all of the parts are in the position shown in FIG. 3. In order to start the operation of the machine, that is to say its normal operation, it is only necessary for the operator to press the push button of the switch 87. This will electrically interconnect contacts 82 and 85. Thus, the relay S will become energized. The switches 73 and 77 are in the position shown in FIG. 3 so that when the operator electrically interconnects the contacts 82 and 85 by closing of the switch 87 the relay S is energized. The energizing of this relay will open the normally closed switches $S_{II}$ and $S_V$ and will close the normally open switches $S_I$, $S_{III}$, and $S_{IV}$. The operator need only momentarily hold the switch 87 in its closed position. Upon releasing the switch it returns to the position shown in FIG. 3, but since the holding relay switch $S_I$ is closed, the circuit remains closed. Because the switch $S_{II}$ at this time is open, the time-delay relay Z is unenergized at this time. The closing of the switch $S_{III}$ actuates the magnetic clutch 40, so that the drive is connected to the shaft 30 and rotates the latter. Also, the magnetic brake 55 is energized by the closing of the switch $S_{IV}$ so that the brake is disengaged and the shaft 30 is free to rotate. Furthermore, since the switch $S_V$ is open, the electromagnet of the control 52 is unenergized and thus the manual clutch means 42 is open.

Assuming now that the operator wishes to stop the normal operation of the machine so as to be able to operate the same manually, for example, then the operator will simply actuate the switch 73 so as to place the contacts 69 and 70 out of electrical connection with each other, and the switch 73 need only be open momentarily for this purpose. As soon as the switch 73 is opened the relay S becomes unenergized and all of the switches return to the position shown in FIG. 3, and of course as soon as the operator releases the push button in the switch 73, this switch also returns to the position shown in FIG. 3. Thus, the opening of the switch 73 has resulted in closing of the switch $S_{II}$, so that the time-delay relay Z becomes energized. This time-delay relay will close the switch $Z_I$ only after a predetermined delay, so that immediately after the switch 73 has been opened by the operator, the switch $Z_I$ has not yet closed, and therefore with the opening of the switch $S_{IV}$ the magnetic brake becomes unenergized and therefore immediately brakes the rotation of the shaft 30 which very quickly stops rotating. After the predetermined delay period the switch $Z_I$ is closed so that the magnetic brake is unenergized and releases the shaft 30 for rotation. In addition, the de-energizing of the relay S closes the switch $S_V$ so that the solenoid or electromagnet 52 becomes energized and as a result the manual clutch means 42 is engaged. Thus, with the structure of the invention the simple opening of the switch 73 so as to stop the normal operation of the machine engages the manual clutch means 42 so that the machine is immediately ready for manual operation, and of course the brake means operates in a manner described above to very quickly stop the movement of the machine components. The operator can now proceed to set up the machine while operating the latter manually through the manually operable means 37.

If at any time during the setting up operations the operator should desire to drive the machine from the source of power for relatively short periods of time to check the set up, for example, then the operator need only manually depress the push button of the switch 77. Actuating the push button of the switch 77 moves the switch away from the contacts 75 and 78 into engagement with the contacts 98 and 97. As a result the circuit will again be completed through the relay S, so that the machine operates in exactly the same way as during the aforesaid normal operation, except at this time the operation will continue only for as long as the operator maintains the switch 77 in the position where the contacts 97 and 98 are electrically connected to each other. As soon as the operator releases the switch 77 it returns to the position shown in FIG. 3 so that the relay S is again unenergized. It will be noted that the closing of the circuit through the contacts 97 and 98 again results in energizing the drive clutch means 40 while de-energizing the manual clutch means 42, so that there is absolutely no danger to the operator since hand wheel 37 will be prevented from turning during the relatively short periods of time when the operator drives the machine from the motor 14 while manually maintaining the switch 77 in the position where the contacts 97 and 98 are electrically connected to each other. It should be noted that the operator can depress and release the push button of the switch 77 during the setting up period as many times as desired so that the machine can be driven from the motor 14 for any periods of time determined simply by manual actuation of the switch 77.

The magnetic brake means 55 of the invention is of particular advantage. As a result of this feature whenever the operator opens the switch 73 so as to stop the operation of the machine, the brake means will immediately bring the machine to a stop so that it is possible to again resume operations while continuing the same program of operations without any changes in the cycle of operations. Furthermore, when the machine is stopped by opening the switch 73 further movement of the various carriages is reliably prevented and in addition actuation of adjusted limit switches and the like is avoided with this arrangement. Moreover, it will be seen that with the brake 55, since it provides the braking action when the electromagnet is unenergized, if there should be a sudden unexpected interruption in the supply of current, the brake means will automatically stop the operation of the machine so that injury to the machine itself or to tools is reliably avoided in an automatic manner.

It will be understood that each of the elements described above, or two or more together, may also find a useful application in other types of machine tools differing from the types described above.

While the invention has been illustrated and described as embodied in machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, transmission means for transmitting motion to parts of the machine tool; machine drive means; machine drive clutch means connecting said machine drive means to said transmission means when said machine drive clutch means is engaged, and disconnecting said machine drive means from said transmission means when said machine drive clutch means is disengaged; manually operable means capable of being moved by the operator; manual drive clutch means connecting said manually operable means to said transmission means for actuating the latter from said manually operable means when said manual drive clutch means is engaged, and said manual drive clutch means disengaging said manually operable means from said transmission means when said manual drive clutch means is disengaged; a pair of electrical operating means respectively connected to said machine drive clutch means and said manual clutch means for respectively operating said drive and manual clutch means; and electrical connecting means interconnecting said pair of electrical operating means for disengaging one of said clutch means in response to engagement of the other of said clutch means and vice versa, whereby mechanical actuation of said transmission means is avoided when said manual drive clutch means is engaged and whereby said transmission means is connected to said drive means when said manual drive clutch means is disengaged.

2. In a machine tool as recited in claim 1, said machine drive clutch means being a magnetic clutch.

3. In a machine tool as recited in claim 1, the electrical operating means which is operatively connected to said manual drive clutch means including an electromagnet which is operatively connected to said manual drive clutch means.

4. In a machine tool as recited in claim 1, said transmission means including a rotary transmission shaft and said manually operable means including a rotary hand wheel freely turnable on said shaft with respect thereto but incapable of moving axially with respect to said shaft, said manual drive clutch means including one clutch member fixed to said hand wheel and a second clutch member axially shiftable on said shaft for cooperation with said one clutch member but constrained to rotate with said shaft, and the electrical operating means which is electrically operatively connected to said manual drive clutch means including an electromagnet and a linkage operated thereby and operatively connected to said axially shiftable clutch member for moving the same into and out of engagement with the clutch member fixed to said hand wheel.

5. In a machine tool, in combination, transmission means for transmitting motion to parts of the machine tool; machine drive means; machine drive clutch means connecting said machine drive means to said transmission means when said machine drive clutch means is engaged, and disconnecting said machine drive means from said transmission means when said machine drive clutch means is disengaged; manually operable means capable of being moved by the operator; manual drive clutch means connecting said manually operable means to said transmission means for actuating the latter from said manually operable means when said manual drive clutch means is engaged, and said manual drive clutch means disengaging said manually operable means from said transmission means when said manual drive clutch means is disengaged; means operatively connected with both of said clutch means for disengaging one of said clutch means in response to engagement of the other of said clutch means and vice versa, whereby mechanical actuation of said transmission means is avoided when said manual drive clutch means is engaged and whereby said transmission means is connected to said drive means when said manual drive clutch means is disengaged; and brake means operatively connected to said transmission means for braking the same to stop the movement thereof when said brake means is engaged, said brake means and said machine drive clutch means being operatively connected to each other for actuating said brake means to brake the operation of said transmission means when said machine drive clutch means is disengaged.

6. In a machine tool, in combination, transmission means for transmitting motion to parts of the machine tool; machine drive means; machine drive clutch means connecting said machine drive means to said transmission means when said machine drive clutch means is engaged, and disconnecting said machine drive means from said transmission means when said machine drive clutch means is disengaged; manually operable means capable of being moved by the operator; manual drive clutch means connecting said manually operable means to said transmission means for actuating the latter from said manually operable means when said manual drive clutch means is engaged, and said manual drive clutch means disengaging said manually operable means from said transmission means when said manual drive clutch means is disengaged; a pair of electrical operating means respectively connected to said machine drive clutch means and said manual drive clutch means for respectively operating said machine drive and manual drive clutch means; and electrical connecting means interconnecting said pair of electrical operating means for disengaging one of said clutch means in response to engagement of the other of said clutch means and vice versa, whereby mechanical actuation of said transmission means is avoided when said manual drive clutch means is engaged and whereby said transmission means is connected to said drive means when said manual drive clutch means is disengaged; brake means cooperating with said transmission means for braking the operation thereof when said brake means operates; a third electrical operating means operatively connected to said brake means for actuating the same, and said electrical connecting means operatively connecting said third electrical operating means with said pair of electrical operating means for at least momentarily actuating said brake means to stop the operation of said transmission means when said machine drive clutch means is disengaged and said manual drive clutch means becomes engaged.

7. In a machine tool, in combination, transmission means for transmitting motion to parts of the machine tool; machine drive means; machine drive clutch means connecting said machine drive means to said transmission means when said machine drive clutch means is engaged, and disconnecting said machine drive means from said transmission means when said machine drive clutch means is disengaged; manually operable means capable of being moved by the operator; manual drive clutch means connecting said manually operable means to said transmission means for actuating the latter from said manually operable means when said manual drive clutch means is engaged, and said manual drive clutch means disengaging said manually operable means from said transmission means when said manual drive clutch means is disengaged; a pair of electrical operating means respectively connected to said machine drive clutch means and said manual drive clutch means for respectively operating said machine drive and manual drive clutch means; electrical connecting means interconnecting said pair of electrical operating means for disengaging one of said clutch means in response to engagement of the other of said clutch means and vice versa, whereby mechanical actuation of said transmission means is avoided when said manual drive clutch means is engaged and whereby said transmission means is connected to said drive means when said manual drive clutch means is disengaged; brake means cooperating with said transmission means for braking the operation thereof when said brake means operates; a third electrical operating means operatively connected to said brake means for actuating the same, and said electrical connecting means operatively connecting said third electrical operating means with said pair of electrical operating means for at least momentarily actuating said brake means to stop the operation of said transmission means when said machine drive clutch means is disengaged and said manual drive clutch means becomes engaged, said brake means braking said transmission means when said third electrical operating means is unenergized and said third electrical operating means placing said brake means in a position where it is inoperative when said third electrical operating means is energized, so that when there is a failure in the supply current said brake means will operate automatically to stop the operation of said transmission means.

8. In a machine tool, in combination, a rotary transmission shaft; a manually operable means freely turnable with respect to said shaft; machine drive means for driving said shaft; electromagnetic clutch means operatively connected with said machine drive means and shaft for connecting said shaft to said machine drive means when said electromagnetic clutch means is engaged, and for disconnecting said machine drive means from said shaft when said electromagnetic clutch means is disengaged; electromagnetic brake means cooperating with said shaft for braking the rotary movement thereof; mechanical clutch means cooperating with said manually operable means and said shaft for connecting said manually operable means to said shaft when said mechanical clutch means is engaged, and for disconnecting said manually operable means from said shaft when said mechanical clutch means is disengaged; electrical operating means cooperating with said mechanical clutch means for controlling the latter; and electrical means interconnecting said electromagnetic clutch means, said electrical operating means, and said electromagnetic brake means for engaging said mechanical clutch means in response to disengagement of said electromagnetic clutch means, whereby said manually operable means is connected to said shaft for manual actuation of said shaft, for engaging said electromagnetic clutch means in response to disengagement of said mechanical clutch means, whereby said machine drive means is connected to said shaft for mechanical actuation of said shaft, and for actuating said brake means to stop the rotation of said shaft for a relatively short period of time immediately subsequent to disengagement of said electromagnetic clutch means.

9. In a machine tool, in combination, a rotary transmission shaft; a manually operable means freely turnable with respect to said shaft; machine drive means for driving said shaft; electromagnetic clutch means operatively connected with said machine drive means when said electromagnetic clutch means is engaged, and for disconnecting said machine drive means from said shaft when said electromagnetic clutch means is disengaged; electromagnetic brake means cooperating with said shaft for braking the rotary movement thereof; mechanical clutch means cooperating with said manually operable means and said shaft for connecting said manually operable means to said shaft when said mechanical clutch means is engaged, and for disconnecting said manually operable means from said shaft when said mechanical clutch means is disengaged; electrical operating means cooperating with said mechanical clutch means for controlling the latter; and electrical means interconnecting said electromagnetic clutch means, said electrical operating means, and said electromagnetic brake means for engaging said mechanical clutch means in response to disengagement of said electromagnetic clutch means, whereby said manually operable means is connected to said shaft for manual actuation of said shaft, for engaging said electromagnetic clutch means in response to disengagement of said mechanical clutch means, whereby said machine drive means is connected to said shaft for mechanical actuation of said shaft, and for actuating said brake means to stop the rotation of said shaft for a relatively short period of time immediately subsequent to disengagement of said electromagnetic clutch means, said electromagnetic brake means braking the rotation of said shaft when said electromagnetic brake means is unenergized.

10. In a machine tool, in combination, transmission means for transmitting motion to parts of the machine tool; machine drive means, machine drive clutch means connecting said machine drive means to said transmission means when said machine drive clutch means is engaged, and disconnecting said machine drive means from said transmission means when said machine drive clutch means is disengaged; manually operable means capable of being moved by the operator; manual drive clutch means connecting said manually operable means to said transmission means for actuating the latter from said manually operable means when said manual drive clutch means is engaged, and said manual drive clutch means disengaging said manually operable means from said transmission means when said manual drive clutch means is disengaged; a pair of electrical operating means respectively connected to said machine drive clutch means and said manual drive clutch means for respectively operating said machine drive and manual drive clutch means; and electrical circuit means interconnecting said pair of electrical operating means for engaging said manual drive clutch means in response to disengagement of said machine drive clutch means, whereby said manually operable means is connected to said transmission means for manual actuation of said transmission means, and for engaging said machine drive clutch means in response to disengagement of said manual drive clutch means, whereby said machine drive means is connected to said transmission means for mechanical actuation of said transmission means, said electrical circuit means including a pair of manually operable switches one of which is actuated for maintaining said machine drive clutch means engaged during normal operation of the machine tool and the other of which is actuated for manually maintaining said machine drive clutch means engaged during driving of the machine tool from said machine drive means while setting the machine up.

11. A combination as set forth in claim 1, further comprising means operatively connected to said machine drive means and to said electrical connecting means for disengaging said machine clutch means and for engaging said manual clutch means in response to deenergization of said drive means, whereby said manually operable means is connected to said transmission means when said drive means is deenergized.

References Cited by the Examiner

UNITED STATES PATENTS

| | | | |
|---|---|---|---|
| 2,354,372 | 7/44 | Groene et al. | 82—22 |
| 2,608,109 | 8/52 | Hoelscher | 74—625 |
| 2,775,908 | 1/57 | Elliott et al. | 74—625 |
| 2,779,448 | 1/57 | Lambach et al. | 192—18.2 |

BROUGHTON G. DURHAM, *Primary Examiner.*